United States Patent
Kurihashi

(10) Patent No.: US 12,233,865 B2
(45) Date of Patent: Feb. 25, 2025

(54) PRECEDING VEHICLE SELECTION DEVICE, PRECEDING VEHICLE SELECTION METHOD, AND NON-TRANSITORY RECORDING MEDIUM

(71) Applicant: TOYOTA JIDOSHA KABUSHIKI KAISHA, Toyota (JP)

(72) Inventor: Sui Kurihashi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 17/976,064

(22) Filed: Oct. 28, 2022

(65) Prior Publication Data
US 2023/0150493 A1    May 18, 2023

(30) Foreign Application Priority Data
Nov. 17, 2021    (JP) .................................. 2021-187310

(51) Int. Cl.
*B60W 30/10* (2006.01)
*B60L 58/12* (2019.01)
*G01C 21/34* (2006.01)

(52) U.S. Cl.
CPC ............. *B60W 30/10* (2013.01); *B60L 58/12* (2019.02); *G01C 21/3469* (2013.01); *B60W 2554/4049* (2020.02)

(58) Field of Classification Search
CPC .................................................. B60W 30/10
See application file for complete search history.

(56) References Cited

U.S. PATENT DOCUMENTS 11,945,438 B2 *    4/2024    Okuda ................... B60W 10/06
2023/0125901 A1 *    4/2023    Kurihashi ............. B60W 50/14
                                                                                701/123

(Continued)

FOREIGN PATENT DOCUMENTS

EP    4036894 A1    8/2022
JP    2008-003675 A    1/2008
(Continued)

OTHER PUBLICATIONS

Nexco Central: "Demonstration Experiment Use Case 7", Dec. 22, 2021.

*Primary Examiner* — Michael A Berns
(74) *Attorney, Agent, or Firm* — Oliff PLC

(57) ABSTRACT

The preceding vehicle selection device includes a processor configured to estimate a continuous running distance from a present time of a surrounding vehicle based on information relating to the surrounding vehicle for each of a plurality of surrounding vehicles, estimate a followable distance when the host vehicle follows the surrounding vehicle based on the continuous running distance from the present time of the surrounding vehicle for each of the plurality of surrounding vehicles, and select the preceding vehicle from among the plurality of surrounding vehicles based on the followable distance. The information relating to the surrounding vehicle includes at least one of an SOC or an amount of remaining fuel of the surrounding vehicle, and a continuous running time or a continuous running distance up to the present time of the surrounding vehicle.

13 Claims, 12 Drawing Sheets

(56) References Cited

U.S. PATENT DOCUMENTS

| | | | | |
|---|---|---|---|---|
| 2023/0131924 A1* | 4/2023 | Kurihashi | ....... | B60W 30/18163 |
| | | | | 340/439 |
| 2023/0150493 A1* | 5/2023 | Kurihashi | .......... | G01C 21/3469 |
| | | | | 701/1 |
| 2023/0382375 A1* | 11/2023 | Kurihashi | ............. | B60W 30/16 |
| 2023/0382387 A1* | 11/2023 | Saito | ............... | B60W 30/18145 |

FOREIGN PATENT DOCUMENTS

| | | | |
|---|---|---|---|
| JP | 2008-275500 A | 11/2008 | |
| JP | 2021-028743 A | 2/2021 | |
| WO | 2021/060114 A1 | 4/2021 | |

\* cited by examiner

FIG. 9

EFFECT INDEX

| | A | B | C | D | E |
|---|---|---|---|---|---|
| ≥20 km | 96 | 88 | 76 | 60 | 40 |
| ≥15 km | 92 | 80 | 64 | 44 | 24 |
| ≥10 km | 84 | 68 | 48 | 28 | 12 |
| ≥5 km | 72 | 52 | 32 | 16 | 4 |
| <5 km | 56 | 36 | 20 | 8 | 0 |

FOLLOWABLE DISTANCE

PRECEDING VEHICLE SELECTION DEVICE, PRECEDING VEHICLE SELECTION METHOD, AND NON-TRANSITORY RECORDING MEDIUM

FIELD

The present invention relates to a preceding vehicle selection device, a preceding vehicle selection method, and a non-transitory recording medium.

BACKGROUND

To reduce the amount of fuel or electric power required for a vehicle to run, it is effective to reduce the air resistance at the time of running. In the past, as a technique for reducing the air resistance at the time of running, a follow-up travel making a vehicle follow a preceding vehicle has been known. In the follow-up travel, due to the effect of reduction of drag by the preceding vehicle, the air resistance acting on a vehicle running behind the preceding vehicle is reduced.

As one example of such follow-up travel, "platooning" where a plurality of vehicles run forming a group is known. In the platoon forming device described in PTL 1, the running plans of groups of vehicles forming platoons are acquired and the group of vehicles with a running plan similar to the host vehicle is selected as the group of vehicles which the host vehicle should merge with. By doing this, the duration of the follow-up travel becomes longer and the effect of the follow-up travel is enhanced.

CITATIONS LIST

Patent Literature

[PTL 1] Japanese Unexamined Patent Publication No. 2008-003675

SUMMARY

Technical Problem

However, detailed running plans such as the destinations and rest stops are information of high levels of privacy. Occupants of vehicles would not necessarily agree to provide their running plans. Further, entering running plans is a bothersome task for occupants of vehicles. Therefore, the opportunities for acquiring the running plans of surrounding vehicles are limited and a preceding vehicle suitable for being followed is liable to be unable to be selected from among the surrounding vehicles.

Therefore, in consideration of the above technical issues, an object of the present invention is to select a preceding vehicle suitable for being followed without relying on the detailed running plans of the surrounding vehicles.

Solution to Problem

The summary of the present disclosure is as follows.

(1) A preceding vehicle selection device for selecting a preceding vehicle suitable to be followed by a host vehicle, comprising a processor configured to: estimate a continuous running distance from a present time of a surrounding vehicle based on information relating to the surrounding vehicle for each of a plurality of surrounding vehicles at surroundings of the host vehicle; estimate a followable distance when the host vehicle follows the surrounding vehicle based on the continuous running distance from the present time of the surrounding vehicle for each of the plurality of surrounding vehicles; and select the preceding vehicle from among the plurality of surrounding vehicles based on the followable distance, wherein the information relating to the surrounding vehicle includes at least one of an SOC or an amount of remaining fuel of the surrounding vehicle, and a continuous running time or a continuous running distance up to the present time of the surrounding vehicle.

(2) The preceding vehicle selection device described in above (1), wherein the processor is configured to calculate a possible cruising distance from the present time of the surrounding vehicle based on the SOC or the amount of remaining fuel of the surrounding vehicle, as the continuous running distance from the present time of the surrounding vehicle.

(3) The preceding vehicle selection device described in above (1), wherein the processor is configured to calculate a possible driving distance from the present time of a driver of the surrounding vehicle based on the continuous running time or the continuous running distance up to the present time of the surrounding vehicle, as the continuous running distance from the present time of the surrounding vehicle.

(4) The preceding vehicle selection device described in above (1), wherein the processor is configured to calculate a possible cruising distance of the surrounding vehicle based on the SOC or the amount of remaining fuel of the surrounding vehicle, calculate a possible driving distance from the present time of a driver of the surrounding vehicle based on the continuous running time or the continuous running distance up to the present time of the surrounding vehicle, and set a shorter distance among the possible cruising distance and the possible driving distance to the continuous running distance from the present time of the surrounding vehicle.

(5) The preceding vehicle selection device described in any one of above (1) to (4), wherein the processor is configured to calculate an effect index representing an effect when the host vehicle follows the surrounding vehicle for a predetermined distance based on the information relating to the surrounding vehicle for each of the plurality of surrounding vehicles, and select the preceding vehicle from among the plurality of surrounding vehicles based on the followable distance and the effect index.

(6) The preceding vehicle selection device described in above (5), wherein the processor is configured to estimate a continuous running distance from the present time of the host vehicle based on the information relating to the host vehicle, and set a shorter distance among the continuous running distance from the present time of the surrounding vehicle and the continuous running distance from the present time of the host vehicle to the followable distance.

(7) The preceding vehicle selection device described in above (6), wherein the processor is configured to calculate a possible cruising distance of the host vehicle based on the SOC or the amount of remaining fuel of the host vehicle, as the continuous running distance from the present time of the host vehicle.

(8) The preceding vehicle selection device described in above (6), wherein the processor is configured to calculate a possible driving distance from the present time of a driver of the host vehicle based on the continuous running time or the continuous running distance up to the present time of the host vehicle, as the continuous running distance from the present time of the host vehicle.

(9) The preceding vehicle selection device described in above (6), wherein the processor is configured to calculate a possible cruising distance of the host vehicle based on an SOC or an amount of remaining fuel of the host vehicle, calculate a possible driving distance from the present time of a driver of the host vehicle based on a continuous running time or a continuous running distance up to the present time of the host vehicle from the present, and set a shorter distance among the possible cruising distance and the possible driving distance to the continuous running distance from the present time of the host vehicle.

(10) A preceding vehicle selecting method executed by a computer, including estimating a continuous running distance from a present time of a surrounding vehicle based on information relating to the surrounding vehicle for each of a plurality of surrounding vehicles at surroundings of the host vehicle, estimating a followable distance when a host vehicle follows a surrounding vehicle based on the continuous running distance from the present time of the surrounding vehicle for each of the plurality of surrounding vehicles, and selecting from among the plurality of surrounding vehicles a preceding vehicle suitable to be followed by the host vehicle based on the followable distance, wherein the information relating to the surrounding vehicle includes at least one of an SOC or an amount of remaining fuel of the surrounding vehicle, and a continuous running time or a continuous running distance up to the present time of the surrounding vehicle.

(11) A non-transitory recording medium having recorded thereon a computer program for selecting a preceding vehicle, the computer program causing a computer to: estimate a continuous running distance from a present time of a surrounding vehicle based on information relating to the surrounding vehicle for each of a plurality of surrounding vehicles at surroundings of the host vehicle; estimate a followable distance when a host vehicle follows a surrounding vehicle based on the continuous running distance from the present time of the surrounding vehicle for each of the plurality of surrounding vehicles; and select from among the plurality of surrounding vehicles a preceding vehicle suitable to be followed by the host vehicle based on the followable distance, wherein the information relating to the surrounding vehicle includes at least one of an SOC or an amount of remaining fuel of the surrounding vehicle, and a continuous running time or a continuous running distance up to the present time of the surrounding vehicle.

Advantageous Effects of Invention

According to the present invention, it is possible to select a preceding vehicle suitable for being followed without relying on the detailed running plans of the surrounding vehicles.

BRIEF DESCRIPTION OF DRAWINGS

FIG. 9 is a view showing one example of a table for determining an evaluation value for surrounding vehicles.

DESCRIPTION OF EMBODIMENTS

Figure 1:
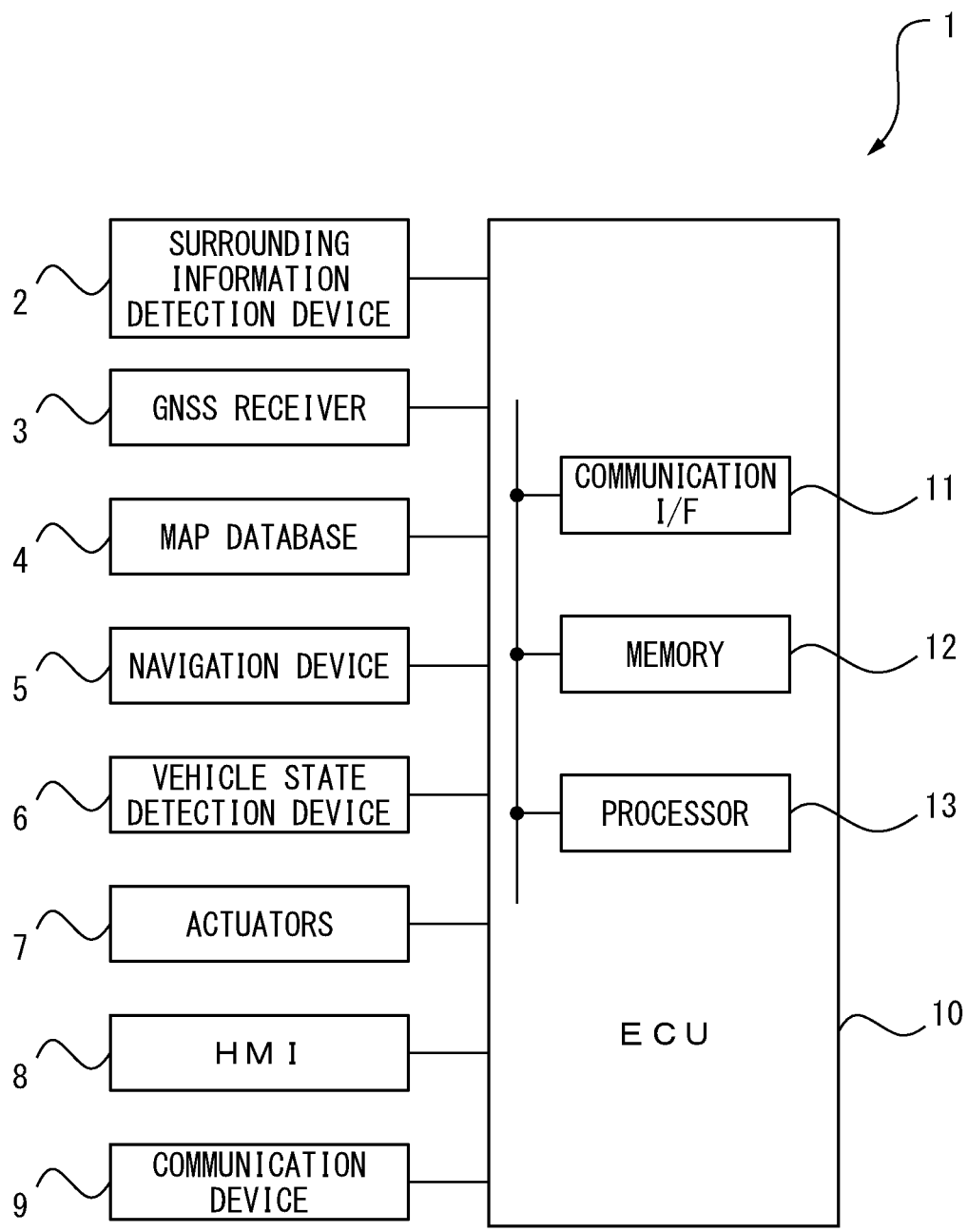
FIG. 1 is a schematic view of the configuration of a vehicle control system including a preceding vehicle selection device according to a first embodiment of the present invention.

Below, embodiments of the present invention will be explained in detail with reference to the drawings. Note that, in the following explanation, similar component elements are assigned the same reference numerals.

First Embodiment

Below, referring to FIG. 1 to FIG. 5, a first embodiment of the present invention will be explained.

FIG. 1 is a schematic view of the configuration of a vehicle control system 1 including a preceding vehicle selection device according to the first embodiment of the present invention. The vehicle control system 1 is mounted in a vehicle and performs various types of control of the vehicle.

As shown in FIG. 1, the vehicle control system 1 is provided with a surrounding information detection device 2, a GNSS receiver 3, a map database 4, a navigation device 5, a vehicle state detection device 6, actuators 7, a human machine interface (HMI) 8, a communication device 9, and an electronic control unit (ECU) 10. The surrounding information detection device 2, the GNSS receiver 3, the map database 4, the navigation device 5, the vehicle state detection device 6, the actuators 7, the HMI 8, and the communication device 9 are electrically connected to the ECU 10 through an internal network based on the CAN (Controller Area Network) or other standard etc.

The surrounding information detection device 2 acquires data on the surroundings of a vehicle (host vehicle) (images, point group data, etc.) and detects surrounding information of the vehicle (for example, surrounding vehicles, lanes, etc.) For example, the surrounding information detection device 2 is a milli wave radar, a camera (for example, stereo camera), a laser imaging detection and ranging device (LIDAR), or an ultrasonic wave sensor (sonar) or any combination of the same. The output of the surrounding information detection device 2, that is, the surrounding information of vehicles detected by the surrounding information detection device 2, is sent to the ECU 10.

The GNSS receiver 3 detects the current position of the vehicle (for example, a latitude and longitude of the vehicle)

based on position measurement information obtained from a plurality of (for example, three or more) positioning satellites. Specifically, the GNSS receiver 3 captures a plurality of positioning satellites and receives signals emitted from the positioning satellites. Further, the GNSS receiver 3 calculates the distances to the positioning satellites based on the difference between the times of emission and times of reception of the signals and detects the current position of the vehicle based on the distances to the positioning satellites and the positions of the positioning satellites (orbital information). The output of the GNSS receiver 3, that is, the current position of the vehicle detected by the GNSS receiver 3, is sent to the ECU 10.

Note that, "GNSS" (Global Navigation Satellite System) is a general name of the GPS of the U.S., GLONASS of Russia, Galileo of Europe, QZSS of Japan, BeiDou of China, IRNSS of India, and other satellite positioning systems. That is, a GPS receiver is one example of the GNSS receiver 3.

The map database 4 stores map information. The ECU 10 acquires map information from the map database 4. Note that, the map database may be provided outside of the vehicle (for example, at the server etc.), and the ECU 10 may acquire map information from outside the vehicle.

The navigation device 5 sets the running route of the vehicle up to the destination based on the current position of the vehicle detected by the GNSS receiver 3, the map information of the map database 4, the input by an occupant of the vehicle (for example, the driver), etc. The running route set by the navigation device 5 is sent to the ECU 10.

The vehicle state detection device 6 detects a state quantity of the vehicle. The vehicle state detection device 6 includes, for example, a vehicle speed sensor for detecting a speed of the vehicle, a yaw rate sensor for detecting a yaw rate of the vehicle, a battery sensor for detecting a state quantity of a battery of the vehicle (voltage, temperature, input/output current, etc.), etc. The output of the vehicle state detection device 6, that is, the state quantity of the vehicle detected by the vehicle state detection device 6, is sent to the ECU 10.

The actuators 7 make the vehicle operate. For example, the actuators 7 include a drive device for acceleration of the vehicle (for example, at least one of an internal combustion engine and an electric motor), a brake actuator for braking (decelerating) the vehicle, and a steering motor for steering the vehicle. The ECU 10 controls the actuators 7 to control the behavior of the vehicle.

In the present embodiment, the vehicle control system 1 functions as an advanced driver assistance system (ADAS) and controls the actuators 7 to make predetermined driver assistance functions operate. The predetermined driver assistance functions, for example, include adaptive cruise control (ACC) for automatically controlling the speed of the vehicle according to whether a preceding vehicle is present, and lane keeping assist (LKA) or lane tracing assist (LTA) for automatically controlling the steering of the vehicle so that the vehicle is maintained in a lane, etc.

The HMI 8 transfers information between the vehicle and the occupants of the vehicle (for example, the driver). The HMI 8 has an output part for outputting information to occupants of the vehicle (for example, a display, speakers, vibration unit, etc.) and an input unit to which information is input by occupants of the vehicle (for example, a touch panel, operating buttons, operating switches, microphone, etc.) The output of the ECU 10 is notified to the occupants of the vehicle through the HMI 8, while the input from the occupants of the vehicle is sent to the ECU 10 through the HMI 8. The HMI 8 is one example of an input device, an output device, or an input/output device. Note that, a mobile terminal of an occupant of the vehicle (a smartphone, a tablet terminal, etc.) may be connected to the ECU 10 to be able to communicate with it through a cable or wirelessly and function as the HMI 8. Further, the HMI 8 may be integral with the navigation device 5.

The communication device 9 can communicate with the outside of the vehicle and enables communication between the vehicle and the outside of the vehicle. For example, the communication device 9 includes a wide area communicator enabling wide area communication between the vehicle and the outside of the vehicle through a communication network like a carrier network or the Internet (for example, a data communication module (DCM)), and an inter-vehicle communicator enabling inter-vehicle communication between the vehicle and a surrounding vehicle using a predetermined frequency band.

The ECU 10 performs various types of control of the vehicle. As shown in FIG. 1, the ECU 10 comprises a communication interface 11, a memory 12, and a processor 13. The communication interface 11 and memory 12 are connected to the processor 13 through signal wires. Note that, in the present embodiment, a single ECU 10 is provided, but a plurality of ECUs may be provided for the individual functions.

The communication interface 11 has an interface circuit for connecting the ECU 10 to the internal vehicle network. The ECU 10 is connected to other vehicle-mounted equipment through the communication interface 11. The communication interface 11 is one example of a communicating part of the ECU 10.

The memory 12, for example, has a volatile semiconductor memory and nonvolatile semiconductor memory. The memory 12 stores computer programs, data, etc. used when the processor 13 performs various types of processing.

The processor 13 has one or more central processing units (CPUs) and their peripheral circuits. Note that, the processor 13 may further have a processing circuit such as a logic unit or arithmetic unit.

In this regard, to reduce the amount of fuel or electric power required for the vehicle to run, it is effective to reduce the air resistance at the time of running. In the past, as a technique for reducing the air resistance at the time of running, a follow-up travel making a vehicle follow a preceding vehicle has been known. In such follow-up travel, the air resistance acting on a vehicle running behind the preceding vehicle is reduced due to the effect of the preceding vehicle in reducing drag. Note that, "platooning" where a plurality of vehicles run formed into groups is one example of the follow-up travel.

Figure 2:
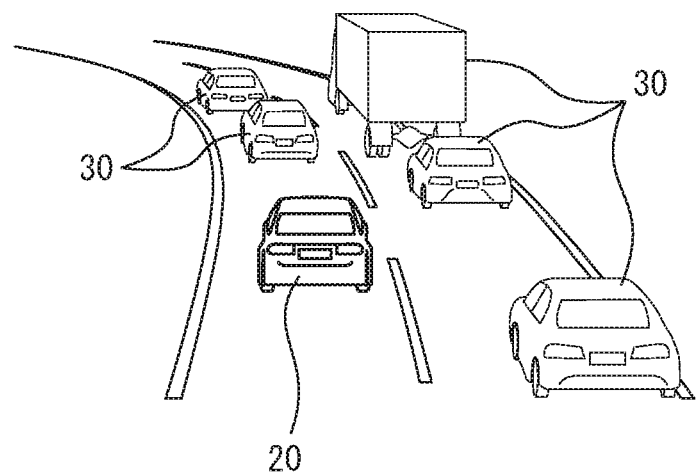
FIG. 2 is a view showing one example of a situation where a plurality of vehicles are running on a motorway.

FIG. 2 is a view showing one example of a situation where a plurality of vehicles are running on a motorway. In the example of FIG. 2, five surrounding vehicles 30 are running in the surroundings of a host vehicle 20. Under these circumstances, the plurality of vehicles (five surrounding vehicles 30) become preceding vehicle candidates of the host vehicle for follow-up travel.

If the host vehicle performs a follow-up travel, it is desirable that the preceding vehicle be selected so that the effect obtained by the follow-up travel becomes as large as possible. In the present embodiment, the ECU 10 mounted in the host vehicle functions as a preceding vehicle selection device for selecting the preceding vehicle suitable to be followed by the host vehicle.

Figure 3:
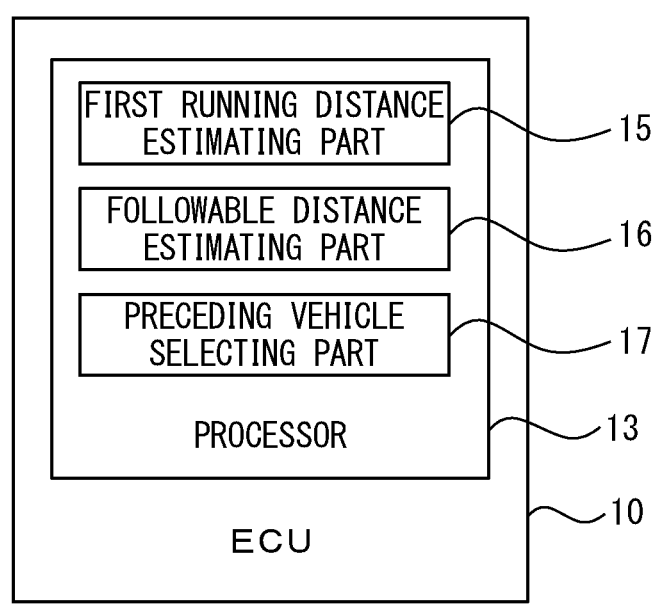
FIG. 3 is a functional block diagram of a processor of an ECU in the first embodiment.

FIG. 3 is a functional block diagram of the processor 13 of the ECU 10 in the first embodiment. In the present embodiment, the processor 13 has a first running distance estimating part 15, a followable distance estimating part 16, and a preceding vehicle selecting part 17. The first running distance estimating part 15, the followable distance estimating part 16, and the preceding vehicle selecting part 17 are function modules realized by a computer program stored in the memory 12 of the ECU 10 being run by the processor 13 of the ECU 10. Note that, these function modules may be realized by dedicated processing circuits provided at the processor 13.

The first running distance estimating part 15 estimates the continuous running distance from the present time of a surrounding vehicle based on information relating to the surrounding vehicle for each of the plurality of surrounding vehicles around the host vehicle. For example, information relating to a surrounding vehicle includes at least one of a state of charge of a battery (SOC) or an amount of remaining fuel of the surrounding vehicle and a continuous running time or a continuous running distance up to the present time of the surrounding vehicle. That is, the first running distance estimating part 15 estimates the continuous running distance from the present time of a surrounding vehicle based on at least one of an SOC or an amount of remaining fuel of the surrounding vehicle and a continuous running time or continuous running distance up to the present time of the surrounding vehicle. By this, it is possible to estimate the continuous running distance from the present time of a surrounding vehicle without acquiring a detailed running plan including rest stops and the destination from the surrounding vehicle. Below, a specific example of a method of estimating a continuous running distance from the present time of a surrounding vehicle will be explained.

As one example of a situation where a vehicle running toward a destination will leave a running lane, mention may be made of recharging the vehicle due to insufficient electric power or refueling the vehicle due to insufficient fuel. That is, if the possible cruising distance of the vehicle becomes zero, continuous running of the vehicle will be interrupted and the vehicle will stop for recharging or refueling. Further, basically, the possible cruising distance of a vehicle becomes shorter the lower the SOC of the vehicle and becomes shorter the smaller the amount of remaining fuel of the vehicle. For this reason, the first running distance estimating part 15 calculates the possible cruising distance of a surrounding vehicle based on the SOC or the amount of remaining fuel of the surrounding vehicle so as to estimate the continuous running distance from the present time of the surrounding vehicle. Note that, the "possible cruising distance of a surrounding vehicle" means the distance over which the surrounding vehicle can run without requiring recharging and refueling.

Further, as another example of a situation where a vehicle running toward a destination will leave the running lane, mention may be made of a driver resting so as to recover from fatigue. That is, if a possible driving distance of the driver becomes zero, continuous running of the vehicle will be interrupted and the vehicle will stop for a rest. Further, basically, the possible driving distance of the driver of a vehicle becomes shorter the longer the continuous running time or the continuous running distance up to the present time of the vehicle. For this reason, the first running distance estimating part 15 calculates the possible driving distance from the present time of the driver of a surrounding vehicle based on the continuous running time or the continuous running distance up to the present time of the surrounding vehicle so as to estimate the continuous running distance from the present time of the surrounding vehicle.

Further, the first running distance estimating part 15 estimates the continuous running distance from the present time of a surrounding vehicle by comparing the possible cruising distance of the surrounding vehicle and the possible driving distance from the present time of the driver of the surrounding vehicle. Specifically, the first running distance estimating part 15 sets the shorter distance of the possible cruising distance and the possible driving distance to the continuous running distance from the present time of the surrounding vehicle. That is, if recharging or refueling is expected to be performed before a rest stop, the possible cruising distance is set to the continuous running distance, while if a rest stop is expected to be made before recharging or refueling, the possible driving distance is set to the continuous running distance.

The followable distance estimating part 16 estimates a followable distance when the host vehicle follows a surrounding vehicle based on the continuous running distance from the present time of the surrounding vehicle for each of the plurality of surrounding vehicles. In the present embodiment, the followable distance estimating part 16 sets the continuous running distance from the present time of the surrounding vehicle to the followable distance.

The preceding vehicle selecting part 17 selects a preceding vehicle from among the plurality of surrounding vehicles based on the followable distance. Specifically, the preceding vehicle selecting part 17 selects the surrounding vehicle with the longest followable distance as the preceding vehicle. By doing this, it is possible to lengthen the continuous time of a follow-up travel and in turn possible to enhance the effect obtained by the follow-up travel. Further, in the present embodiment, the followable distance for the case where the host vehicle follows a surrounding vehicle is calculated without acquiring detailed running plans including rest stops and the destinations from the surrounding vehicles. For this reason, it is possible to select a preceding vehicle suitable for being followed by the host vehicle without relying on detailed running plans of the surrounding vehicles.

Figure 4:
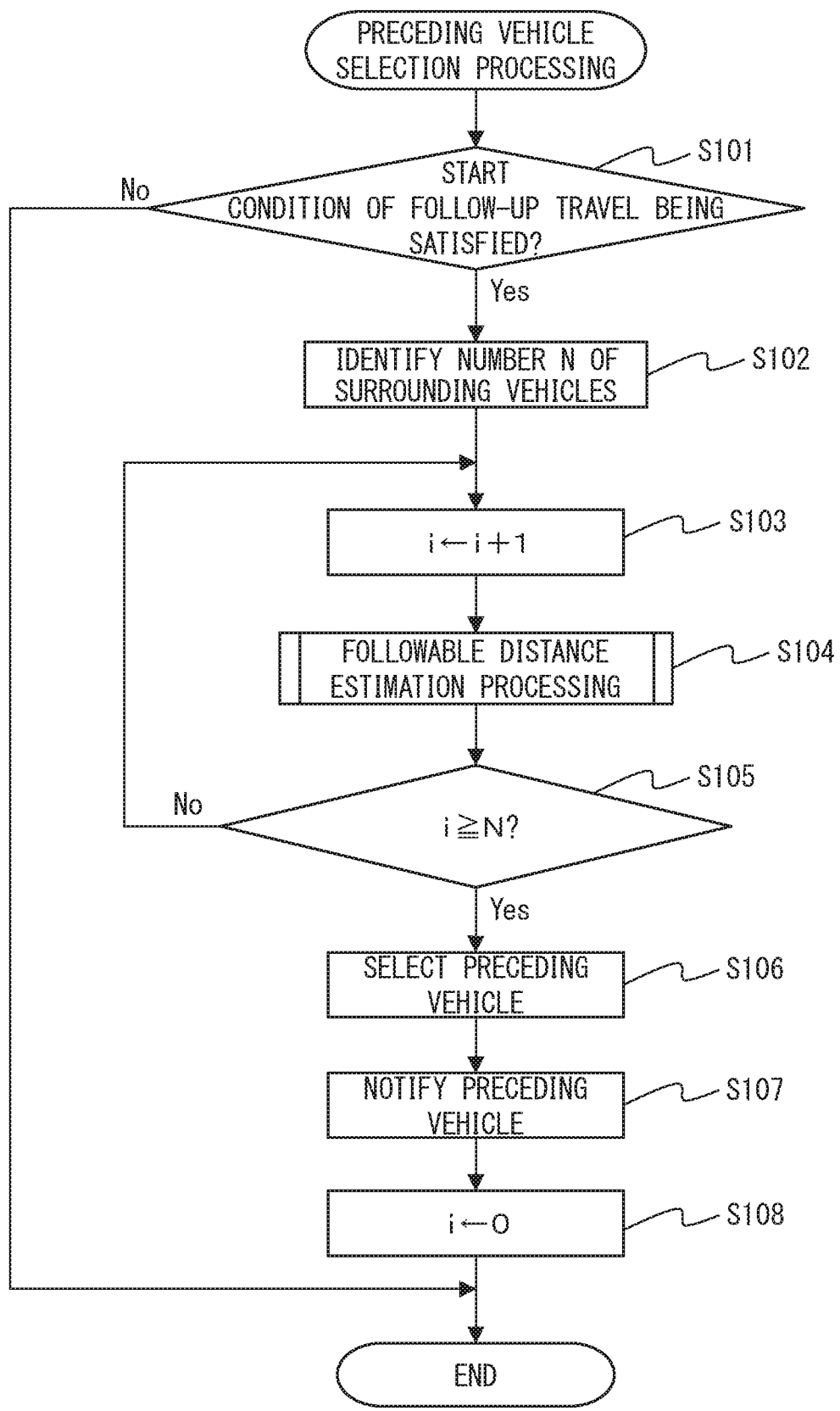
FIG. 4 is a flow chart showing a control routine of preceding vehicle selection processing in the first embodiment.

Below, referring to FIG. 4 and FIG. 5, a control routine of the above-mentioned processing will be explained in detail. FIG. 4 is a flow chart showing a control routine of preceding vehicle selection processing in the first embodiment. The present control routine is repeatedly performed by the processor 13 of the ECU 10 at predetermined intervals.

First, at step S101, the preceding vehicle selecting part 17 judges whether a start condition of a follow-up travel is satisfied. The start condition of a follow-up travel is determined in advance. For example, it is satisfied when an occupant of the host vehicle requests actuation of ACC through the HMI 8. Note that, the start condition of a follow-up travel may be the host vehicle running on a motorway at greater than or equal to a predetermined speed etc. If at step S101 it is judged that the start condition of a follow-up travel is not satisfied, the present control routine ends.

On the other hand, if at step S101 it is judged that the start condition of a follow-up travel is satisfied, the present control routine proceeds to step S102. At step S102, the preceding vehicle selecting part 17 identifies the number N of surrounding vehicles able to communicate with the host vehicle by inter-vehicle communication, that is, the number N of surrounding vehicles positioned in a range of communication of inter-vehicle communication, and assigns vehicle nos. (1 to N) to each of N number of surrounding vehicles.

Next, at step S103, the preceding vehicle selecting part 17 adds "1" to the vehicle no. "i" to update the vehicle no. "i".

Note that, the initial value of the vehicle no. "i" when the ignition switch of the host vehicle is turned on is zero.

Figure 5:
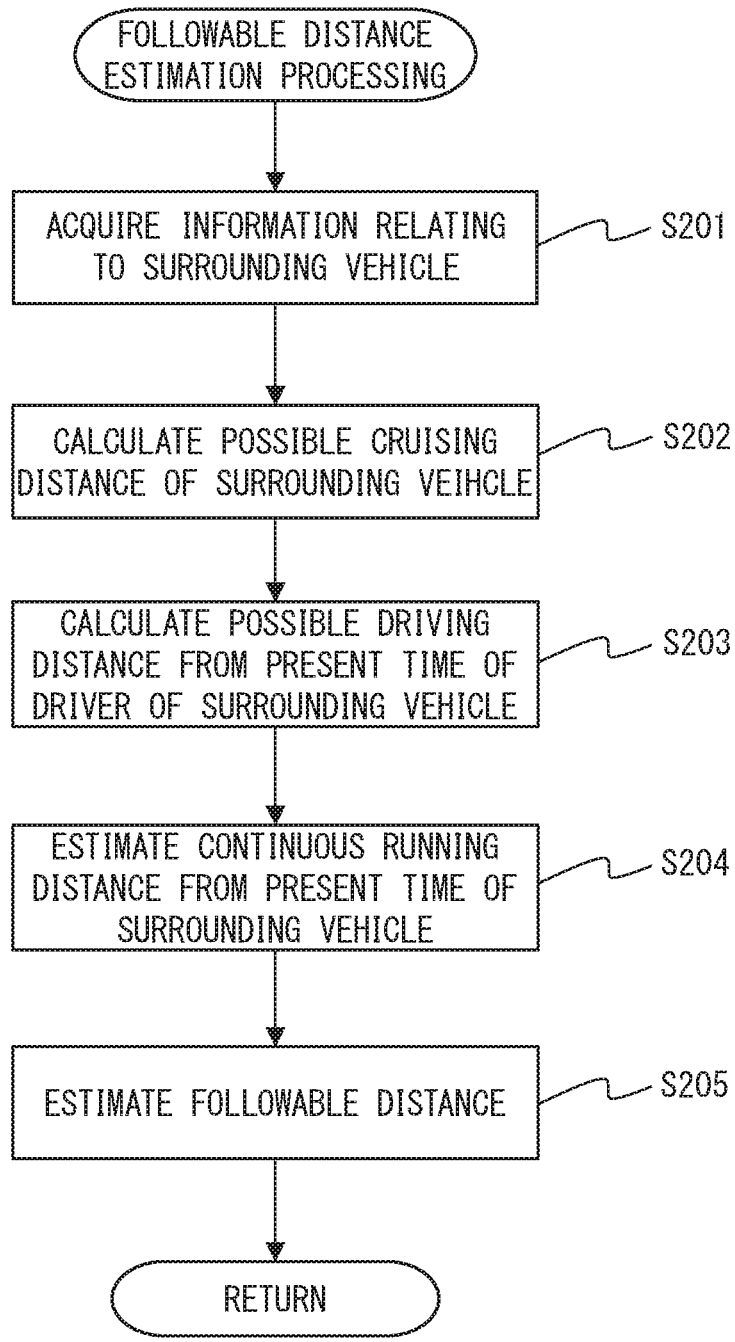
FIG. 5 is a flow chart showing a control routine of followable distance estimation processing in the first embodiment.

Next, at step S104, the subroutine shown in FIG. 5 is executed. FIG. 5 is a flow chart showing a control routine of a followable distance estimation processing in the first embodiment.

First, at step S201, the first running distance estimating part 15 acquires information relating to the surrounding vehicle through inter-vehicle communication between the host vehicle and the surrounding vehicle. In the present embodiment, as information relating to the surrounding vehicle, the position and speed of the surrounding vehicle, the SOC or amount of remaining fuel, the continuous running time or continuous running distance up to the present time, the average electric power consumption or average fuel consumption in a predetermined time period, etc. are sent from the surrounding vehicle to the host vehicle. The start point of measurement of the continuous running time or continuous running distance is when the ignition switch is turned on or when the vehicle starts moving after stopping for greater than or equal to a predetermined time (for example 5 minutes to 20 minutes).

Next, at step S202, the first running distance estimating part 15 calculates the possible cruising distance of the surrounding vehicle. For example, when the surrounding vehicle is a vehicle powered by electricity (for example, a battery electric vehicle (BEV), plug-in hybrid electric vehicle (PHEV), etc.), the first running distance estimating part 15 calculates the possible cruising distance of the surrounding vehicle based on the SOC and the average electric power consumption in a predetermined time period of the surrounding vehicle. Specifically, the first running distance estimating part 15 calculates the possible cruising distance by multiplying the average electric power consumption with the amount of remaining electric power, which corresponds to the SOC. On the other hand, if the surrounding vehicle is a vehicle powered by fuel (for example, a gasoline engine vehicle, diesel engine vehicle, etc.), the first running distance estimating part 15 calculates the possible cruising distance of the surrounding vehicle based on the amount of remaining fuel and the average fuel consumption in a predetermined time period of the surrounding vehicle. Specifically, the first running distance estimating part 15 calculates the possible cruising distance by multiplying the average fuel consumption with the amount of remaining fuel. Note that, instead of the average electric power consumption or the average fuel consumption sent from the surrounding vehicle, a predetermined value may be used.

Next, at step S203, the first running distance estimating part 15 calculates the possible driving distance from the present time of the driver of the surrounding vehicle. For example, the first running distance estimating part 15 calculates the possible driving distance from the present time of the driver of the surrounding vehicle based on the continuous running time up to the present time of the surrounding vehicle and the speed of the surrounding vehicle. Specifically, the first running distance estimating part 15 calculates the possible driving distance from the present time by multiplying the vehicle speed with the value of a predetermined upper limit continuous running time (for example, 4 hours) minus the continuous running time up to the present time. Note that, in the latter half part of the upper limit continuous running time, the possibility of a rest stop rises, and therefore the latter half part may be weighted. In this case, for example, if the upper limit continuous running time is 4 (h), the weighting is 0.5, and the continuous running time up to the present time is 1 (h), the possible driving distance from the present time is calculated by multiplying the vehicle speed with 2 (h) (2 (h)+2 (h)×0.5−1 (h)). Further, if the set speed of the ACC in the surrounding vehicle is sent to the host vehicle through inter-vehicle communication, the set speed of the ACC at the surrounding vehicle may be used as the speed of the surrounding vehicle.

Further, the first running distance estimating part 15 may calculate the possible driving distance from the present time of the driver of the surrounding vehicle based on the continuous running distance up to the present time of the surrounding vehicle. In this case, the first running distance estimating part 15 calculates the possible driving distance from the present time by subtracting the continuous running distance up to the present time from a predetermined upper limit continuous running distance (for example 400 to 500 km).

Next, at step S204, the first running distance estimating part 15 estimates the continuous running distance from the present time of the surrounding vehicle based on the possible cruising distance of the surrounding vehicle and the possible driving distance from the present time of the driver of the surrounding vehicle. Specifically, the first running distance estimating part 15 sets the shorter distance of the possible cruising distance and the possible driving distance to the continuous running distance from the present time.

Next, at step S205, the followable distance estimating part 16 estimates the followable distance when the host vehicle follows the surrounding vehicle based on the continuous running distance from the present time of the surrounding vehicle. Specifically, the followable distance estimating part 16 sets the continuous running distance from the present time of the surrounding vehicle to the followable distance.

After step S205, the subroutine of FIG. 5 ends and the present control routine proceeds to step S105 of FIG. 4. At step S105, the preceding vehicle selecting part 17 judges whether the vehicle no. "i" is greater than or equal to N. If it is judged that the vehicle no. "i" is less than N, the present control routine returns to step S103, and then step S104 is again executed to calculate the followable distance for another surrounding vehicle.

On the other hand, if at step S105 it is judged that the vehicle no. "i" is greater than or equal to N, the present control routine proceeds to step S106. At step S106, the preceding vehicle selecting part 17 selects a preceding vehicle from among the N number of surrounding vehicles based on the followable distance. Specifically, the preceding vehicle selecting part 17 selects the surrounding vehicle with the longest followable distance among the N number of surrounding vehicles as the preceding vehicle.

Next, at step S107, the preceding vehicle selecting part 17 notifies the preceding vehicle to the occupant of the host vehicle (for example, the driver) through the HMI 8. For example, if surrounding vehicles 30 of the host vehicle 20 are shown on a display of the HMI 8 as shown in FIG. 2, the preceding vehicle selecting part 17 displays the surrounding vehicle 30 selected as the preceding vehicle by a display mode different from the other surrounding vehicles 30 (for example, in transparency, brightness, color (hue), color lightness, color saturation, etc.)

Note that, in addition to visual notification or instead of visual notification, the preceding vehicle selecting part 17 may notify the occupant of the host vehicle of the timing of change of lane for moving behind the surrounding vehicle selected as the preceding vehicle by at least one of sound and vibration. For example, if a lane change to a right side lane is prompted by vibration, the preceding vehicle selecting part 17 uses a vibration unit of the HMI 8 to make a right half of a steering wheel of the host vehicle vibrate at the timing of the lane change.

Further, if the host vehicle is an automated vehicle in which all of the acceleration, steering, and deceleration (braking) of the vehicle are performed automatically, the preceding vehicle selecting part 17 may control the actuators 7 of the host vehicle so that the host vehicle follows the surrounding vehicle selected as the preceding vehicle. That is, the preceding vehicle selecting part 17 may automatically start a follow-up travel to the preceding vehicle.

Next, at step S108, the preceding vehicle selecting part 17 resets the vehicle no. "i" to zero. After step S108, the present control routine ends.

Note that, step S203 of FIG. 5 may be omitted and the first running distance estimating part 15 may calculate the possible cruising distance of the surrounding vehicle as the continuous running distance from the present time of the surrounding vehicle based on the SOC or the amount of remaining fuel of the surrounding vehicle. Further, step S202 of FIG. 5 may be omitted, and the first running distance estimating part 15 may calculate the possible driving distance from the present time of the driver of the surrounding vehicle as the continuous running distance from the present time of the surrounding vehicle based on the continuous running time or the continuous running distance up to the present time of the surrounding vehicle.

Second Embodiment

The configuration and control of the vehicle control system according to a second embodiment are basically similar to the configuration and control of the first embodiment except for the points explained below. Therefore, the second embodiment of the present invention will be explained focusing on parts different from the first embodiment.

As explained above, to enhance the effect of a follow-up travel, it is preferable to select a surrounding vehicle with a long followable distance as the preceding vehicle. However, a surrounding vehicle with a longest followable distance is not always optimal as the preceding vehicle. Therefore, in the second embodiment, an effect index representing the effect when the host vehicle follows a surrounding vehicle for a predetermined distance is calculated and the preceding vehicle is selected from among the plurality of surrounding vehicles based on the followable distance and the effect index. Due to this, it is possible to select the preceding vehicle more suited as the vehicle to be followed by the host vehicle.

Figure 6:
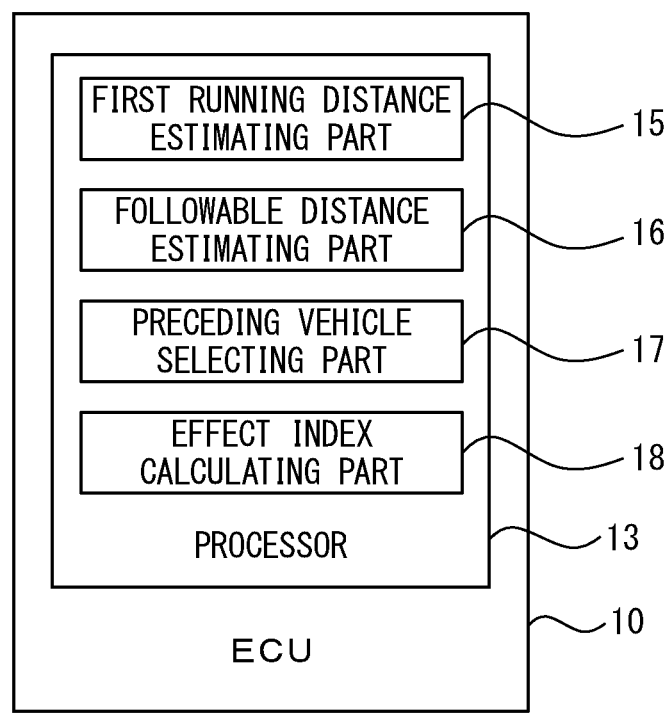
FIG. 6 is a functional block diagram of a processor of an ECU in a second embodiment.

FIG. 6 is a functional block diagram of the processor 13 of the ECU 10 in the second embodiment. In the second embodiment, the processor 13 has an effect index calculating part 18 in addition to the first running distance estimating part 15, the followable distance estimating part 16, and the preceding vehicle selecting part 17. The first running distance estimating part 15, the followable distance estimating part 16, the preceding vehicle selecting part 17, and the effect index calculating part 18 are function modules realized by a computer program stored in the memory 12 of the ECU 10 being run by the processor 13 of the ECU 10. Note that, these function modules may be realized by dedicated processing circuits respectively provided at the processor 13.

The effect index calculating part 18 calculates an effect index representing the effect when the host vehicle follows a surrounding vehicle for a predetermined distance based on the information relating to the surrounding vehicle for each of the plurality of surrounding vehicles. Further, in the second embodiment, the preceding vehicle selecting part 17 selects the preceding vehicle from among the plurality of surrounding vehicles based on the followable distances estimated by the followable distance estimating part 16 and the effect indexes calculated by the effect index calculating part 18.

For example, the larger the degree of reduction of the air resistance by the follow-up travel, the greater the effect of improvement of the fuel consumption or electric power consumption by the follow-up travel. Further, if the relative speed of the host vehicle and a surrounding vehicle is small, following the surrounding vehicle becomes easier compared with if the relative speed is large. Further, the higher the stability of speed of a surrounding vehicle, the more it is possible to reduce the waste of electric power or fuel by acceleration and deceleration of the host vehicle at the time of the follow-up travel. For this reason, in the present embodiment, the effect index calculating part 18 calculates the effect index based on the degree of reduction of the air resistance by a follow-up travel to a surrounding vehicle, the relative speed of the host vehicle and the surrounding vehicle, and the stability of speed of the surrounding vehicle.

Figure 7:
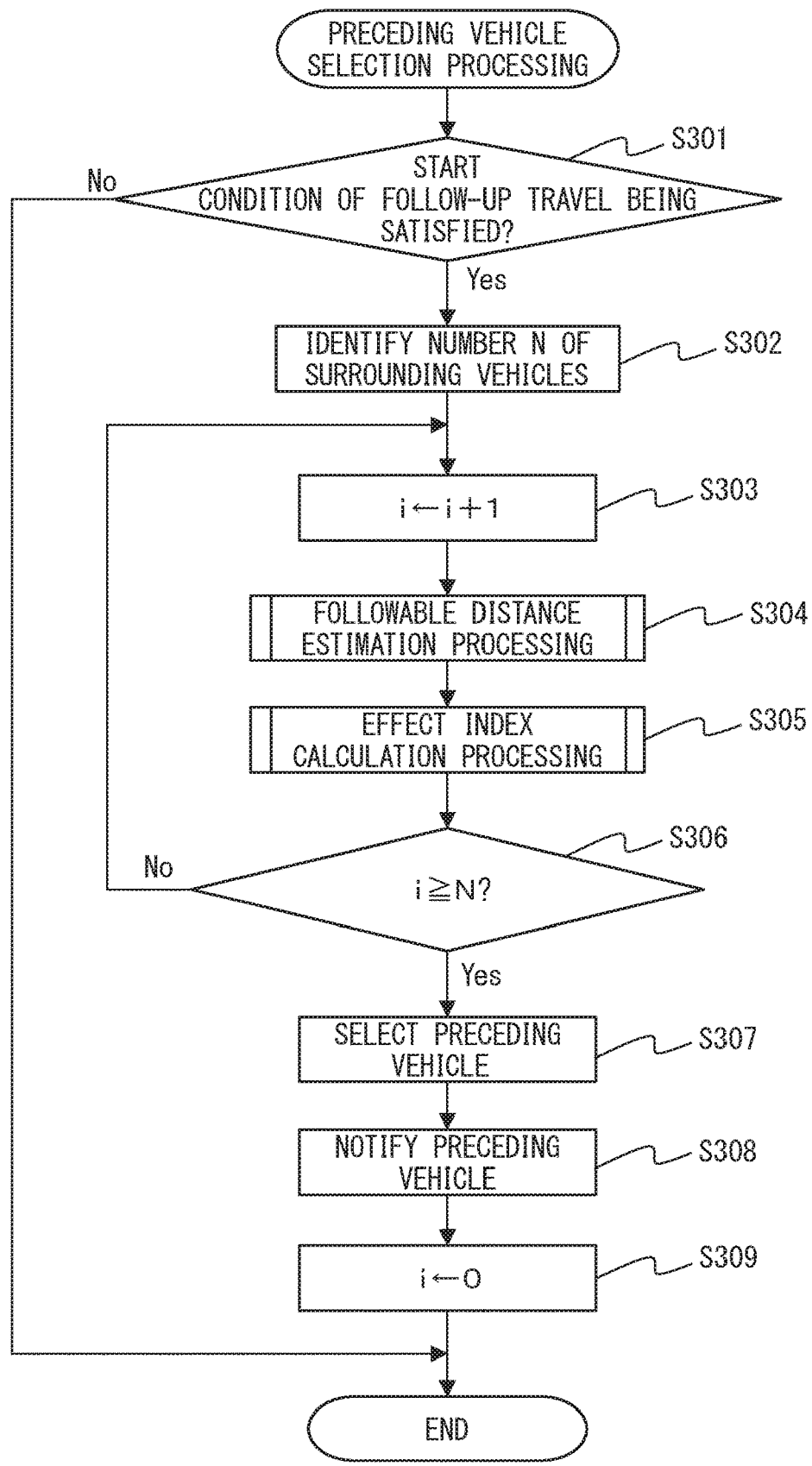
FIG. 7 is a flow chart showing a control routine of preceding vehicle selection processing in the second embodiment.

FIG. 7 is a flow chart showing a control routine of preceding vehicle selection processing in the second embodiment. The present control routine is repeatedly performed by the processor 13 of the ECU 10 at predetermined intervals.

Figure 8:
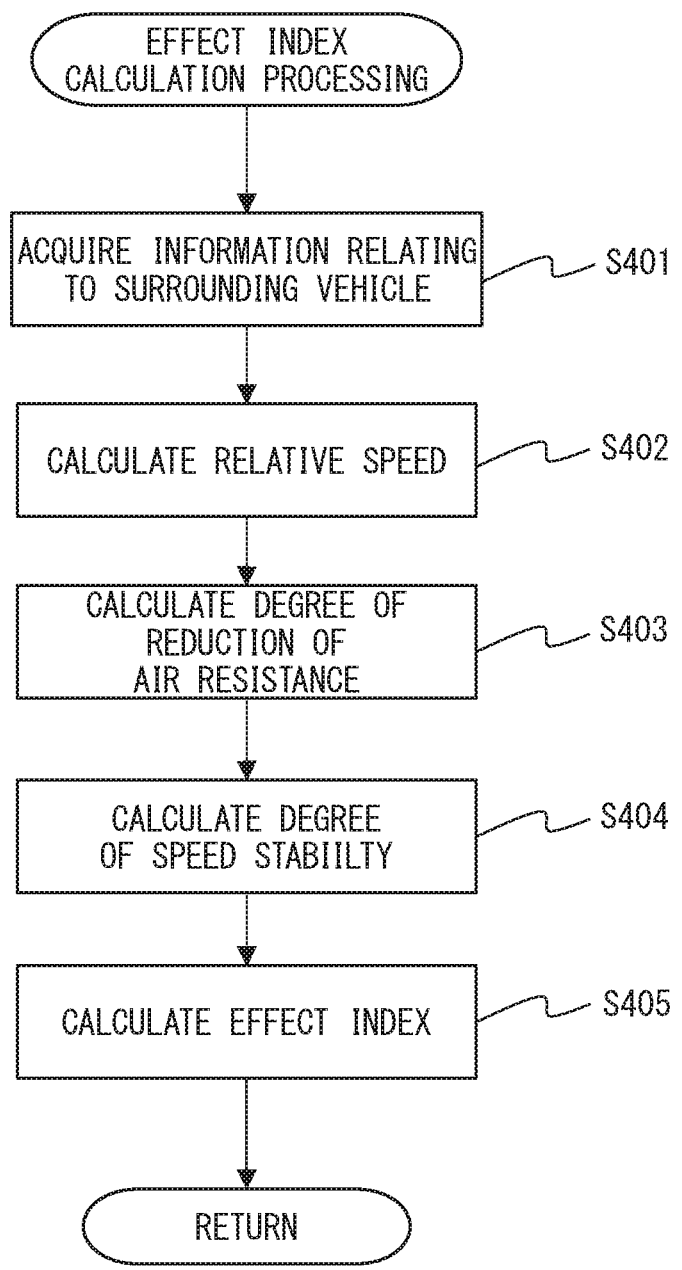
FIG. 8 is a flow chart showing a control routine of effect index calculation processing in the second embodiment.

Steps S301 to S304 are performed in the same way as steps S101 to S104 of FIG. 4. After step S304, at step S305, the subroutine shown in FIG. 8 is performed. FIG. 8 is a flow chart showing a control routine of effect index calculation processing in the second embodiment.

First, at step S401, the effect index calculating part 18 acquires information relating to the surrounding vehicle through inter-vehicle communication of the host vehicle and the surrounding vehicle. In the present embodiment, as information relating to the surrounding vehicle, the position, speed, width, and length of the surrounding vehicle, the operating state (on or off) of the ACC at the surrounding vehicle, etc. are acquired.

Next, at step S402, the effect index calculating part 18 calculates the relative speed of the host vehicle and the surrounding vehicle based on the information relating to the surrounding vehicle. Specifically, the effect index calculating part 18 calculates the relative speed between the host vehicle and the surrounding vehicle as the difference in the speed of the host vehicle and the speed of the surrounding vehicle detected by the speed sensors of the vehicle state detection devices 6 (relative speed=|speed of host vehicle−speed of surrounding vehicle|). Note that, as the speed of the host vehicle, the set speed of the ACC set by an occupant of the host vehicle (for example, the driver) may be used. Further, if the set speed of the ACC at the surrounding vehicle is sent to the host vehicle through inter-vehicle communication, the set speed of the ACC at the surrounding vehicle may be used as the speed of the surrounding vehicle.

Next, at step S403, the effect index calculating part 18 calculates the degree of reduction of the air resistance due to a follow-up travel to the surrounding vehicle based on the information relating to the surrounding vehicle. For example, the effect index calculating part 18 calculates an estimated value of the front projected area of the surrounding vehicle based on the width and length of the surrounding vehicle, and calculates the degree of reduction of the air resistance based on this estimated value and the speed of the surrounding vehicle. In this case, the larger the estimated value of the front projected area, the larger the degree of reduction of the air resistance is made. Note that, information on the type of application of the surrounding vehicle (for example, a motor vehicle for a passenger transport business, a motor vehicle for a freight transport business, etc.) and information on the type of size (for example, a large sized motor vehicle, medium size motor vehicle, ordinary motor vehicle, etc.) may be sent to the host vehicle through inter-vehicle communication, and the effect index calculating part 18 may calculate the degree of reduction of the air resistance based on the information on the type of application and information on the type of size.

Next, at step S404, the effect index calculating part 18 calculates the degree of speed stability of the surrounding vehicle based on information relating to the surrounding vehicle. For example, the effect index calculating part 18 calculates the degree of speed stability of the surrounding vehicle based on the operating state of the ACC in the surrounding vehicle. In this case, if the operating state of the ACC is ON, the degree of speed stability of the surrounding vehicle is made higher compared with if the operating state of the ACC is OFF. Note that, the effect index calculating part 18 may calculate the degree of speed stability of the surrounding vehicle based on the history of the speed of the surrounding vehicle (for example, the amount of change of the speed in a predetermined time period) etc.

Next, at step S405, the effect index calculating part 18 uses a map or calculation formula to calculate the effect index for an i-th surrounding vehicle based on the relative speed, the degree of reduction of the air resistance, and the degree of stability of the vehicle speed. At this time, the smaller the relative speed, the higher the effect index is made, the larger the degree of reduction of the air resistance, the higher the effect index is made, and the higher the degree of stability of the vehicle speed, the higher the effect index is made. For example, the effect index is classified as ranks A to E. If the rank is A, the effect index becomes the highest, while if the rank is E, the effect index becomes the lowest.

Note that, the effect index calculating part 18 may correct the effect index based on information on the preference of the occupant of the host vehicle relating to the selection of the preceding vehicle. In this case, the preference information is registered in advance by the occupant of the host vehicle and stored in the memory 12 etc. of the ECU 10. For example, as preference information, the occupant of the host vehicle inputs to the HMI 8 whether or not he or she permits following a large sized vehicle such as a bus or truck, whether he or she permits a lane change of the host vehicle for a follow-up travel, etc. In this case, if following a large sized vehicle is not permitted, the effect index is corrected so that the effect index becomes lower for a surrounding vehicle which is a large sized vehicle (for example, the effect index is made zero). Further, if a lane change of the host vehicle for a follow-up travel is not permitted, the effect index is corrected so that the effect index becomes lower for a surrounding vehicle running in a lane different from the host vehicle (for example, the effect index is made zero).

After step S405, the subroutine of FIG. 8 is ended and the present control routine proceeds to S306 of FIG. 7. At step S306, the preceding vehicle selecting part 17 judges whether the vehicle no. "i" is greater than or equal to N. If it is judged that the vehicle no. "i" is less than N, the present control routine returns to step S303 and steps S304 and S305 are again performed for calculating the followable distance and the effect index for another surrounding vehicle.

On the other hand, if at step S306 it is judged that the vehicle no. "i" is greater than or equal to N, the present control routine proceeds to step S307. At step S307, the preceding vehicle selecting part 17 selects the preceding vehicle from among the N number of surrounding vehicles based on the followable distances and the effect indexes. For example, the preceding vehicle selecting part 17 determines an evaluation value based on the followable distance and the effect index for each of the N number of surrounding vehicles and selects as the preceding vehicle the surrounding vehicle with the highest evaluation value among the N number of surrounding vehicles.

The evaluation value is, for example, determined using a table such as shown in FIG. 9. FIG. 9 is a view showing one example of the table for determining the evaluation value for surrounding vehicles. In the example of FIG. 9, the values of the followable distances are laid out on the vertical while the ranks of the effect index are laid out on the horizontal. As shown in FIG. 9, the evaluation value is made higher the longer the followable distance and is made higher the higher the effect index. Note that, the effect index may be calculated as a numerical value and the evaluation value may be determined based on the followable distance and the effect index using a map or calculation formula.

Next, in the same way as steps S107 and S108 of FIG. 4, at step S308, the preceding vehicle selecting part 17 notifies the preceding vehicle to the occupant of the host vehicle, and at step S309, the preceding vehicle selecting part 17 resets the vehicle no. "i" to zero. After step S309, the present control routine ends.

Third Embodiment

The configuration and control of the according to a third embodiment are basically similar to the configuration and control of the vehicle control system according to the second embodiment except for the points explained below. Therefore, the third embodiment of the present invention will be explained focusing on parts different from the second embodiment.

In the first embodiment and the second embodiment, to estimate the followable distance when the host vehicle follows a surrounding vehicle, the continuous running distance from the present time of the surrounding vehicle is estimated. However, there is a possibility of the host vehicle stopping before the surrounding vehicle for recharging, refueling, rest, etc. In this case, the followable distance is limited by the continuous running distance from the present time of the host vehicle. Therefore, in the third embodiment, the followable distance is estimated based on the continuous running distance from the present time of the surrounding vehicle and the continuous running distance from the present time of the host vehicle. By doing this, it is possible to more precisely estimate the followable distance and in turn possible to select a more suitable preceding vehicle to be followed by the host vehicle.

Figure 10:
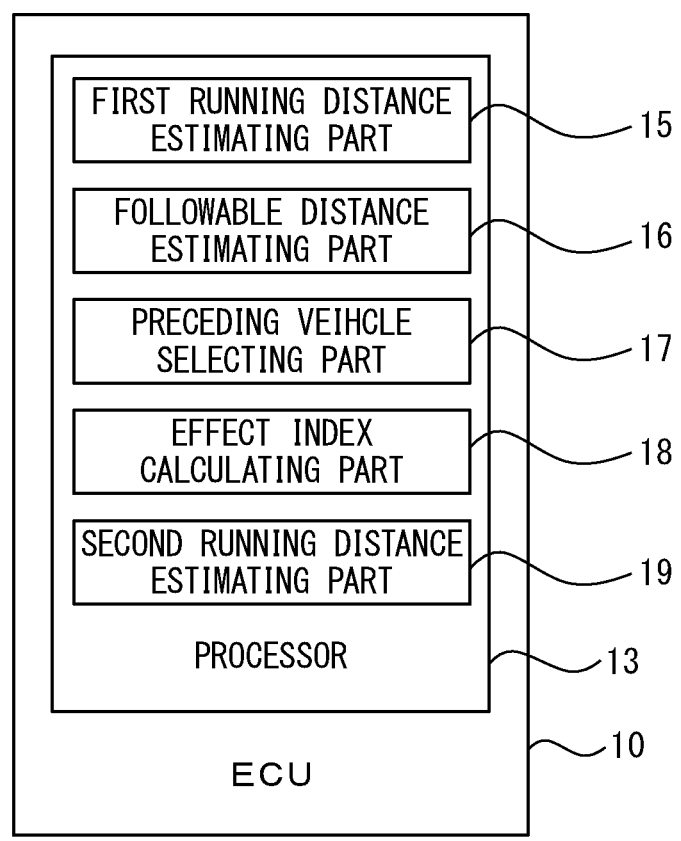
FIG. 10 is a functional block diagram of a processor of an ECU in a third embodiment.

FIG. 10 is a functional block diagram of the processor 13 of the ECU 10 in the third embodiment. In the third embodiment, the processor 13 has a second running distance estimating part 19 in addition to the first running distance estimating part 15, the followable distance estimating part 16, the preceding vehicle selecting part 17, and the effect index calculating part 18. The first running distance estimating part 15, the followable distance estimating part 16, the preceding vehicle selecting part 17, the effect index calculating part 18, and the second running distance estimating part 19 are function modules realized by a computer program stored in the memory 12 of the ECU 10 being run by the processor 13 of the ECU 10. Note that, these function modules may respectively be realized by dedicated processing circuits provided in the processor 13.

The second running distance estimating part 19 estimates the continuous running distance from the present time of the host vehicle based on information relating to the host vehicle. For example, the information relating to the host vehicle includes at least one of the SOC or the amount of remaining fuel of the host vehicle and the continuous running time or the continuous running distance up to the present time of the host vehicle. That is, the second running distance estimating part 19 estimates the continuous running distance from the present time of the host vehicle based on at least one of the SOC or the amount of remaining fuel of the host vehicle and the continuous running time or the continuous running distance up to the present time of the host vehicle. By doing this, it is possible to estimate the continuous running distance from the present time of the host vehicle without forcing upon the occupant of the host vehicle the input of detailed driving plans including the rest stop and the destination.

The continuous running distance from the present time of the host vehicle is estimated as follows in the same way as the continuous running distance from the present time of a surrounding vehicle. That is, to estimate the continuous running distance from the present time of the host vehicle, the second running distance estimating part 19 calculates the possible cruising distance of the host vehicle based on the SOC or the amount of remaining fuel of the host vehicle and calculates the possible driving distance from the present time of the driver of the host vehicle based on the continuous running time or the continuous running distance up to the present time of the host vehicle. Further, the second running distance estimating part 19 estimates the continuous running distance from the present time of the host vehicle by comparing the possible cruising distance of the host vehicle and the possible driving distance from the present time of the driver of the host vehicle. Specifically, the second running distance estimating part 19 sets the shorter distance among the possible cruising distance and the possible driving distance to the continuous running distance from the present time of the host vehicle.

Further, in the third embodiment, the followable distance estimating part 16 estimates the followable distance when the host vehicle follows a surrounding vehicle based on the continuous running distance from the present time of the surrounding vehicle and the continuous running distance from the present time of the host vehicle for each of a plurality of surrounding vehicles. Specifically, the followable distance estimating part 16 sets the shorter distance among the continuous running distance from the present time of the surrounding vehicle and the continuous running distance from the present time of the host vehicle as the followable distance.

Figure 11:
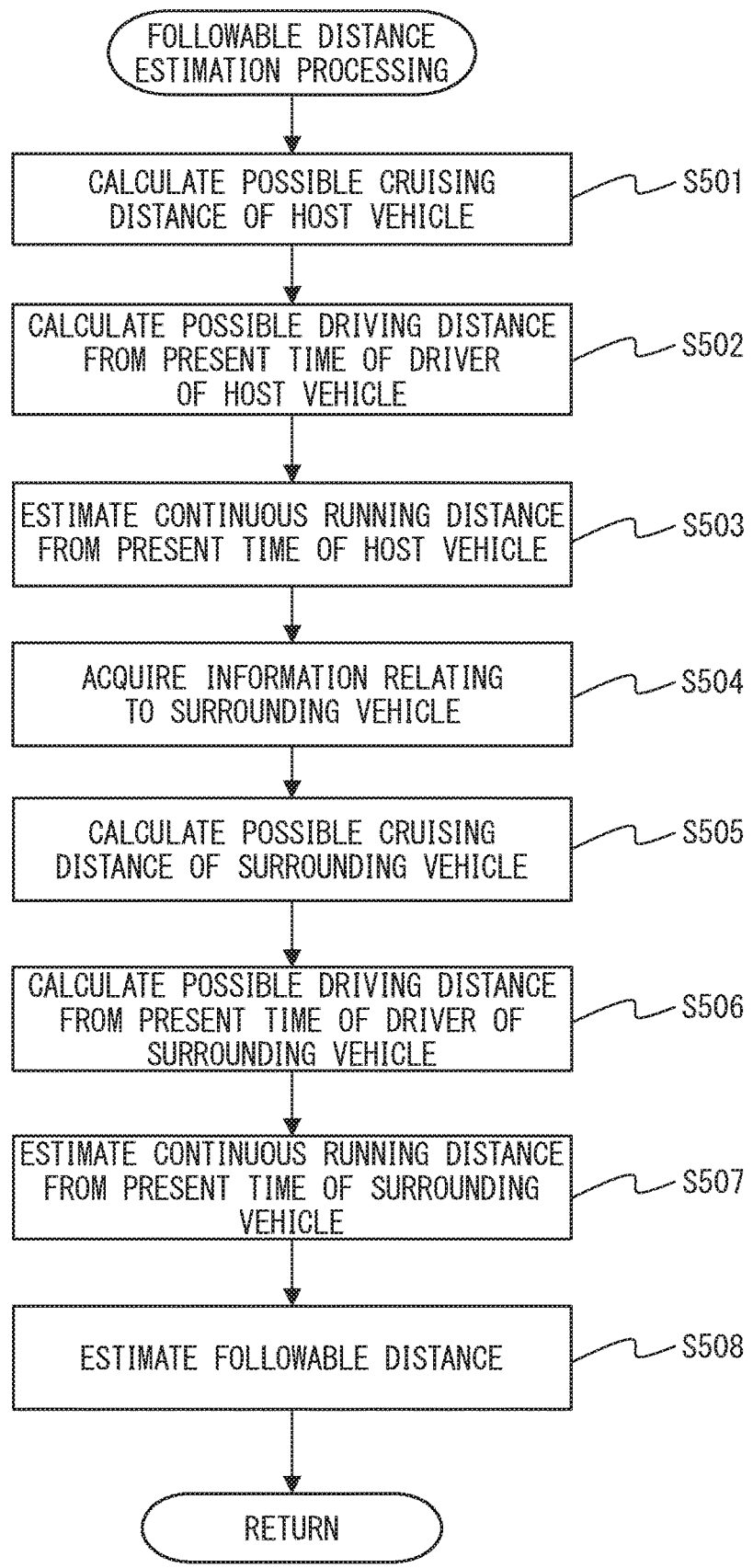
FIG. 11 is a flow chart showing a control routine of followable distance estimation processing in the third embodiment.

In the third embodiment, the control routine of FIG. 7 is performed in the same way as the second embodiment. At step S304, instead of the subroutine shown in FIG. 5, the subroutine shown in FIG. 11 is performed. FIG. 11 is a flow chart showing a control routine of followable distance estimation processing in the third embodiment.

First, at step S501, the second running distance estimating part 19 calculates the possible cruising distance of the host vehicle. For example, if the host vehicle is a vehicle powered by electricity (for example, a battery electric vehicle (BEV), plug-in hybrid electric vehicle (PHEV), etc.), the second running distance estimating part 19 calculates the possible cruising distance of the host vehicle based on the SOC and the average electric power consumption in a predetermined time period of the host vehicle. Specifically, the second running distance estimating part 19 multiplies the average electric power consumption with the amount of remaining electric power, which corresponds to the SOC, to thereby calculate the possible cruising distance. The SOC of the host vehicle is, for example, calculated based on the voltage and temperature of the battery or the input/output current of the battery detected by the battery sensor of the vehicle state detection device 6. On the other hand, if the host vehicle is a vehicle powered by fuel (for example, a gasoline engine vehicle, diesel engine vehicle, etc.), the second running distance estimating part 19 calculates the possible cruising distance of the host vehicle based on the amount of remaining fuel of the host vehicle and the average fuel consumption in a predetermined time period. Specifically, the second running distance estimating part 19 multiplies the average fuel consumption with the amount of remaining fuel to thereby calculate the possible cruising distance.

Next, at step S502, the second running distance estimating part 19 calculates the possible driving distance from the present time of the driver of the host vehicle. For example, the second running distance estimating part 19 calculates the possible driving distance from the present time of the driver of the host vehicle based on the continuous running time from the present time of the host vehicle and the vehicle speed of the host vehicle. Specifically, the second running distance estimating part 19 multiples the value of the predetermined upper limit continuous running time (for example, 4 hours) minus the continuous running time up to the present time with the vehicle speed to thereby calculate the possible driving distance from the present time. Note that, since in the second half part of the upper limit continuous running time, the possibility of a rest stop rises, the second half part may be weighted. Further, as the speed of the host vehicle, the set speed of the ACC may be used.

Further, the second running distance estimating part 19 may calculate the possible driving distance from the present time of the driver of the host vehicle based on the continuous running distance up to the present time of the host vehicle. In this case, the second running distance estimating part 19 calculates the possible driving distance from the present time by subtracting the continuous running distance up to the present time from a predetermined upper limit continuous running distance (for example 400 to 500 km).

Next, at step S503, the second running distance estimating part 19 estimates the continuous running distance from the present time of the host vehicle based on the possible cruising distance of the host vehicle and the possible driving distance from the present time of the driver of the host vehicle. Specifically, the second running distance estimating part 19 sets the shorter distance among the possible cruising distance and the possible driving distance to the continuous running distance from the present time.

Next, steps S504 to S507 are performed in the same way as steps S201 to S204 of FIG. 5. After step S507, at step S508, the followable distance estimating part 16 estimates the followable distance when the host vehicle follows a surrounding vehicle based on the continuous running distance from the present time of the surrounding vehicle and the continuous running distance from the present time of the host vehicle. Specifically, the followable distance estimating part 16 sets the shorter distance among the continuous running distance from the present time of the surrounding vehicle and the continuous running distance from the present time of the host vehicle to the followable distance. After step S508, the subroutine of FIG. 11 ends and, as explained above relating to the second embodiment, steps S306 to S309 of FIG. 7 are performed.

Fourth Embodiment

The configuration and control of the vehicle control system according to a fourth embodiment are basically similar to the configuration and control of the vehicle control system according to the first embodiment except for the points explained below. Therefore, the fourth embodiment of the present invention will be explained focusing on parts different from the first embodiment.

Figure 12:
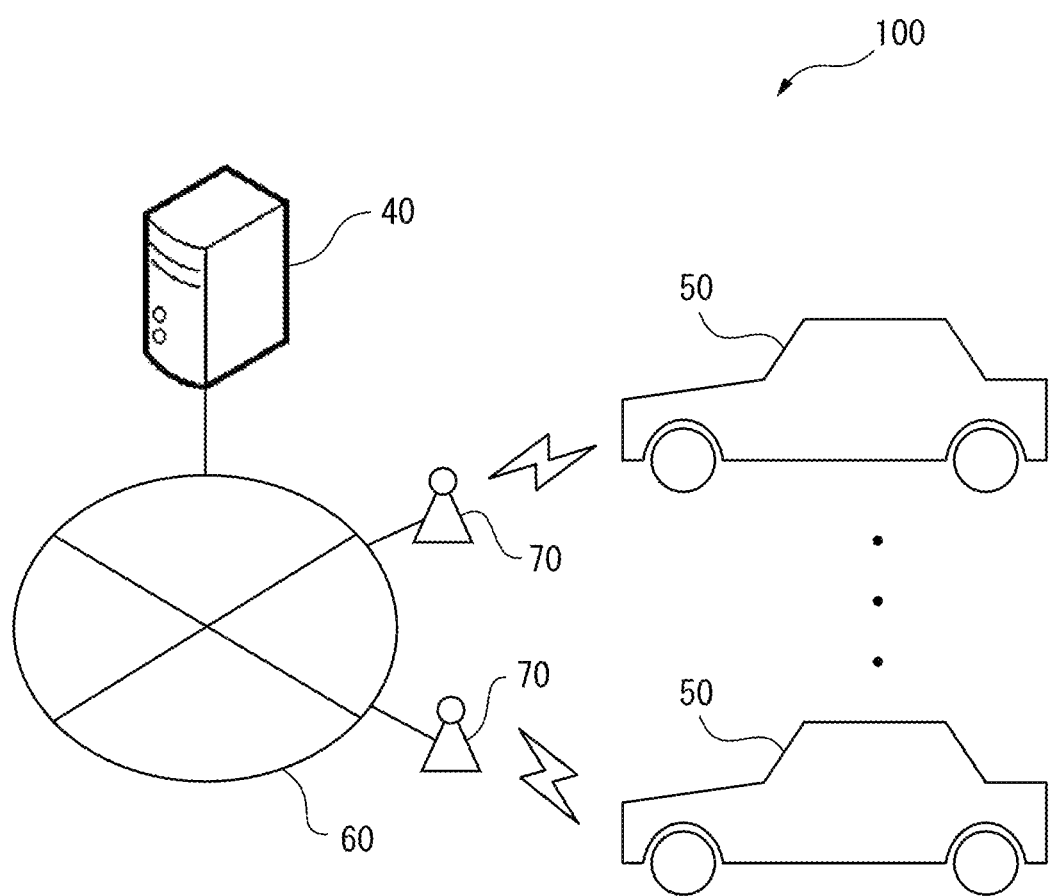
FIG. 12 is a schematic view of the configuration of a client-server system including a preceding vehicle selection device according to a fourth embodiment of the present invention.

FIG. 12 is a schematic view of the configuration of a client-server system 100 including a preceding vehicle selection device according to the fourth embodiment of the present invention. The client-server system 100 is provided with a server 40 and a plurality of vehicles 50. The server 40 can communicate with each of the plurality of vehicles 50 through a communication network 60 like a carrier network or an Internet network and a wireless base station 70. That is, the server 40 can communicate with each of the plurality of vehicles 50 through wide area communication.

Figure 13:
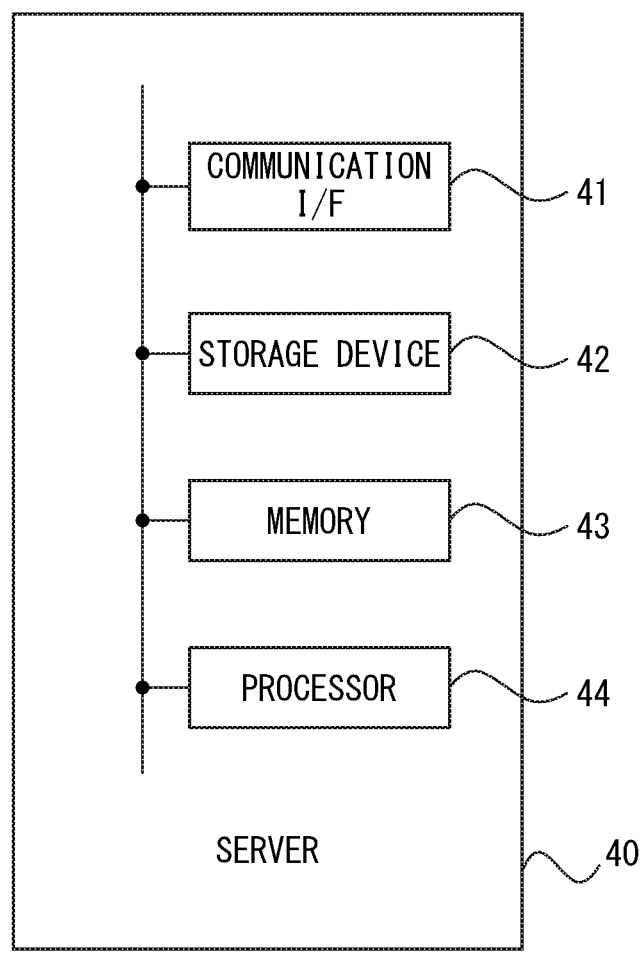
FIG. 13 is a view schematically showing the configuration of a server.

FIG. 13 is a view schematically showing the configuration of the server 40. The server 40 is provided with a communication interface 41, a storage device 42, a memory 43, and a processor 44. The communication interface 41, the storage device 42, and the memory 43 are connected with the processor 44 through signal wires. Note that, the server 40 may further be provided with an input device such as a keyboard and mouse, an output device such as a display, etc. Further, the server 40 may be configured from a plurality of computers.

The communication interface 41 has an interface circuit for connecting the server 40 to the communication network 60. The server 40 communicates with the outside of the server 40 (for example, the plurality of vehicles 50) through the communication network 60. The communication interface 41 is one example of a communicating part of the server 40.

The storage device 42, for example, has a hard disk drive (HDD), a solid state drive (SDD), or an optical recording medium and its access device. The storage device 42 stores various types of data, for example, stores map information, information of a plurality of vehicles 50 (identification information, positional information, etc.), a computer program for the processor 44 to perform various types of processing, etc. The storage device 42 is one example of a storage part of the server 40.

The memory 43 has a volatile semiconductor memory (for example, RAM). The memory 43, for example, temporarily stores the various types of data etc. used when various types of processing are performed by the processor 44. The memory 43 is another example of a storage part of the server 40.

The processor 44 has one or more CPUs and their peripheral circuits. Note that, the processor 44 may further have a logic unit, an arithmetic unit, or a graphic unit or other such processing circuit.

In the fourth embodiment, the server 40 functions as the preceding vehicle selection device instead of the ECU 10. The processor 44 of the server 40 has a first running distance estimating part 15, a followable distance estimating part 16, and a preceding vehicle selecting part 17. In this case, the first running distance estimating part 15, the followable distance estimating part 16, and the preceding vehicle selecting part 17 are function modules realized by a computer program stored in the storage device 42 of the server 40 being run by the processor 44 of the server 40.

Therefore, in the fourth embodiment, the control routine of the preceding vehicle selection processing of FIG. 4 is performed by the processor 44 of the server 40. First, at step S101, the preceding vehicle selecting part 17 judges whether a start condition of a follow-up travel is satisfied in any of the vehicles 50 in the plurality of vehicles 50. If this judgment is affirmative, in the following processing step, the vehicle 50 which satisfies the start condition of a follow-up travel is recognized as a host vehicle.

At step S102, the preceding vehicle selecting part 17 identifies the number N of surrounding vehicles positioned around the host vehicle (for example, in predetermined ranges in front of and in back of the host vehicle) based on the position information of the plurality of vehicles 50 including the host vehicle and assigns vehicle nos. (1 to N) to the respective N number of surrounding vehicles.

Next, at step S103, the preceding vehicle selecting part 17 adds "1" to the vehicle no. "i". Note that, the initial value of the vehicle no. "i" is zero.

Next, at step S304, the subroutine shown in FIG. 5 is performed.

First, at step S201, the first running distance estimating part 15 acquires information relating to each surrounding vehicle through wide area communication between the server 40 and the surrounding vehicles. In the present embodiment, as information relating to the surrounding vehicle, the position, speed, a SOC, or an amount of remaining fuel of the surrounding vehicle, the continuous running time or the continuous running distance up to the present time, the average electric power consumption or the average fuel consumption in a predetermined time period etc. are sent from the surrounding vehicle to the server 40. After step S201, steps S202 to S205 are performed in the same way as the first embodiment.

After step S205, the subroutine of FIG. 5 ends and the present control routine proceeds to step S105 of FIG. 4. Steps S105 and S106 are performed in the same way as the first embodiment. After step S106, at step S107, the preceding vehicle selecting part 17 notifies the preceding vehicle to the occupant of the host vehicle. Specifically, the preceding vehicle selecting part 17 sends information relating to the preceding vehicle (for example, the positional information of the preceding vehicle etc.) to the host vehicle. As a result, the ECU 10 of the host vehicle notifies the preceding vehicle to the occupant of the host vehicle through the HMI 8. That is, the preceding vehicle selecting part 17 notifies the preceding vehicle to the occupant of the host vehicle through the ECU 10 of the host vehicle.

Next, at step S108, the preceding vehicle selecting part 17 resets the vehicle no. "i" to zero. After step S108, the present control routine ends.

Above, preferred embodiments according to the present invention were explained, but the present invention is not limited to these embodiments and can be corrected and changed in various ways within the language of the claims. For example, the vehicle at which the vehicle control system 1 is provided may be a manually driven vehicle not having driver assistance functions.

Further, the computer program for making the functions of the different parts of the processor 13 of the ECU 10 or the processor 44 of the server 40 be realized by a computer may be provided in a form stored in a computer readable recording medium. The computer readable recording medium is, for example, a magnetic recording medium, an optical recording medium, or a semiconductor memory.

Further, the above-mentioned embodiments can be worked combined in any way. In the case where the second embodiment or the third embodiment and the fourth embodiment are combined, the processing performed by the ECU 10 in the second embodiment or the third embodiment is performed by the server 40.

REFERENCE SIGNS LIST

10 electronic control unit (ECU)
13 processor
15 first running distance estimating part
16 followable distance estimating part
17 preceding vehicle selecting part
20 host vehicle
30 surrounding vehicle
40 server
44 processor

The invention claimed is:

1. An autonomous vehicle control system comprising:
a host vehicle, which is an autonomous vehicle having a plurality of actuators configured to control acceleration, deceleration, and steering of the host vehicle, the plurality of actuators being controlled to autonomously drive the host vehicle; and
a preceding vehicle selection device for selecting, from among a plurality of candidate preceding vehicles, a preceding vehicle suitable to be followed by the host vehicle, the plurality of candidate preceding vehicles located ahead of the host vehicle in a travelling direction of the host vehicle, the preceding vehicle selection device comprising:
a wide area communicator configured to communicate with the plurality of candidate preceding vehicles; and
a processor configured to:
acquire via the wide area communicator, from each of the plurality of candidate preceding vehicles, information including at least one of (a) a state-of-charge or an amount of remaining fuel of the candidate preceding vehicle, and (b) a continuous running time or a continuous running distance that the candidate preceding vehicle has been continuously driven up to a present time;
estimate, for each of the plurality of candidate preceding vehicles, a continuous running distance that the candidate preceding vehicle can travel from the present time without stopping based on the information acquired from the candidate preceding vehicle via the wide area communicator;
estimate, for each of the plurality of candidate preceding vehicles, a followable distance by which the host vehicle can follow the candidate preceding vehicle based on the continuous running distance that has been estimated for the candidate preceding vehicle; and
select the preceding vehicle that the host vehicle is to follow from among the plurality of candidate preceding vehicles based on the followable distance that has been estimated for each of the plurality of candidate preceding vehicles, wherein
the plurality of actuators are controlled to cause the host vehicle to autonomously follow the preceding vehicle that has been selected for the host vehicle to follow.

2. The autonomous vehicle control system according to claim 1, wherein the processor of the preceding vehicle selection device is configured to estimate, for each of the plurality of candidate preceding vehicles, the continuous running distance that the candidate preceding vehicle can travel from the present time without stopping by calculating a possible cruising distance of the preceding candidate vehicle from the present time based on the state-of-charge or the amount of remaining fuel of the surrounding candidate preceding vehicle.

3. The autonomous vehicle control system according to claim 1, wherein the processor of the preceding vehicle selection device is configured to estimate, for each of the plurality of candidate preceding vehicles, the continuous running distance that the candidate preceding vehicle can travel from the present time without stopping by calculating a possible driving distance from the present time of a driver of the candidate preceding vehicle based on the continuous running time or the continuous running distance that the candidate preceding vehicle has been continuously driven up to the present time.

4. The autonomous vehicle control system according to claim 1, wherein the processor of the preceding vehicle selection device is configured to estimate, for each of the plurality of candidate preceding vehicles, the continuous running distance that the candidate preceding vehicle can travel from the present time without stopping by (1) calculating a possible cruising distance of the preceding candidate vehicle from the present time based on the state-of-charge or the amount of remaining fuel of the preceding candidate vehicle, (2) calculating a possible driving distance from the present time of a driver of the preceding candidate vehicle based on the continuous running time or the continuous running distance that the candidate preceding vehicle has been continuously driven up to the present time, and (3) setting a shorter distance among the possible cruising distance and the possible driving distance as the continuous running distance that the candidate preceding vehicle can travel from the present time without stopping.

5. The autonomous vehicle control system according to claim 1, wherein the processor of the preceding vehicle selection device is configured to calculate, for each of the plurality of candidate preceding vehicles, an effect index representing an effect when the host vehicle follows the preceding candidate vehicle for a predetermined distance based on the information acquired from the candidate preceding vehicle via the wide area communicator, and select the preceding vehicle that the host vehicle is to follow from among the plurality of candidate preceding vehicles based on the followable distance and the effect index.

6. The autonomous vehicle control system according to claim 5, wherein the processor of the preceding vehicle selection device is configured to estimate a continuous running distance that the host vehicle can travel from the present time without stopping based on information relating to the host vehicle, and set, for each of the plurality of candidate preceding vehicles, a shorter distance among (i) the continuous running distance that the candidate preceding vehicle can travel from the present and (ii) the continuous running distance that the host vehicle can travel from the present time.

7. The autonomous vehicle control system according to claim 6, wherein the processor of the preceding vehicle selection device is configured to estimate the continuous running distance that the host vehicle can travel from the present time without stopping by calculating a possible cruising distance of the host vehicle based on a state-of-charge or an amount of remaining fuel of the host vehicle.

8. The autonomous vehicle control system according to claim 6, wherein the processor of the preceding vehicle selection device is configured to estimate the continuous running distance that the host vehicle can travel from the present time without stopping by calculating a possible driving distance from the present time of a driver of the host vehicle based on a continuous running time or a continuous running distance that the host vehicle has been continuously driven up to the present time.

9. The autonomous vehicle control system according to claim 6, wherein the processor of the preceding vehicle selection device is configured to estimate the continuous running distance that the host vehicle can travel from the present time without stopping by (1) calculating a possible cruising distance of the host vehicle based on a state-of-charge or an amount of remaining fuel of the host vehicle, (2) calculating a possible driving distance from the present time of a driver of the host vehicle based on a continuous running time or a continuous running distance that the host vehicle has been continuously driven up to the present time, and (3) setting a shorter distance among the possible cruising distance and the possible driving distance as the continuous running distance that the host vehicle can travel from the present time without stopping.

10. The autonomous vehicle control system according to claim 1, wherein
the preceding vehicle selection device is provided on the host vehicle.

11. The autonomous vehicle control system according to claim 1, wherein
the preceding vehicle selection device is provided on a server that is separate from the host vehicle,
the wide area communicator is configured to communicate with the host vehicle, and
the processor of the preceding vehicle selection device informs the host vehicle, via the wide area communicator, of the preceding vehicle that has been selected for the host vehicle to follow.

12. A vehicle control method of controlling a host vehicle that is an autonomous vehicle having a plurality of actuators configured to control acceleration, deceleration, and steering of the host vehicle, the plurality of actuators being controlled to autonomously drive the host vehicle, the method executed by a computer and including:
acquiring via a wide area communicator, from each of a plurality of candidate preceding vehicles that are located ahead of the host vehicle in a travelling direction of the host vehicle, information including at least one of (a) a state-of-charge or an amount of remaining fuel of the candidate preceding vehicle, and (b) a continuous running time or a continuous running distance that the candidate preceding vehicle has been continuously driven up to a present time;
estimating, for each of the plurality of candidate vehicles, a continuous running distance that the candidate preceding vehicle can travel from the present time without stopping based on the information acquired from the candidate preceding vehicle via the wide area communicator;
estimating, for each of the plurality of candidate vehicles, a followable distance by which the host vehicle can follow the candidate preceding vehicle based on the continuous running distance that has been estimated for the candidate preceding vehicle;
selecting a preceding vehicle that the host vehicle is to follow from among the plurality of candidate preceding vehicles based on the followable distance that has been estimated for each of the plurality of candidate preceding vehicles; and
controlling the plurality of actuators to cause the host vehicle to autonomously follow the preceding vehicle that has been selected for the host vehicle to follow.

13. A non-transitory computer-readable recording medium having recorded thereon a computer program for controlling a host vehicle that is an autonomous vehicle having a plurality of actuators configured to control acceleration, deceleration, and steering of the host vehicle, the plurality of actuators being controlled to autonomously drive the host vehicle, the computer program causing a computer to:
acquire via a wide area communicator, from each of a plurality of candidate preceding vehicles that are located ahead of the host vehicle in a travelling direction of the host vehicle, information including at least one of (a) a state-of-charge or an amount of remaining fuel of the candidate preceding vehicle, and (b) a continuous running time or a continuous running distance that the candidate preceding vehicle has been continuously driven up to a present time;
estimate, for each of the plurality of candidate vehicles, a continuous running distance that the candidate preceding vehicle can travel from the present time without stopping based on the information acquired from the candidate preceding vehicle via the wide area communicator;
estimate, for each of the plurality of candidate vehicles, a followable distance by which the host vehicle can follow the candidate preceding vehicle based on the continuous running distance that has been estimated for the candidate preceding vehicle;
select a preceding vehicle that the host vehicle is to follow from among the plurality of candidate preceding vehicles based on the followable distance that has been estimated for each of the plurality of candidate preceding vehicles; and
control the plurality of actuators to cause the host vehicle to autonomously follow the preceding vehicle that has been selected for the host vehicle to follow.

* * * * *